United States Patent [19]

Scheftic et al.

[11] Patent Number: 5,185,133
[45] Date of Patent: Feb. 9, 1993

[54] METHOD FOR PRODUCING FINE SIZE YELLOW MOLYBDENUM TRIOXIDE POWDER

[75] Inventors: Judy L. Scheftic, South Waverly; Robert G. Mendenhall, Sayre; Michael J. Chereslowsky, Towanda, all of Pa.

[73] Assignee: GTE Products Corporation, Danvers, Mass.

[21] Appl. No.: 235,081

[22] Filed: Aug. 23, 1988

[51] Int. Cl.$^5$ ...................... C01G 39/00; C01G 39/02
[52] U.S. Cl. ........................................ 423/53; 423/54; 423/606
[58] Field of Search ............. 423/53, 54, 606, DIG. 6; 75/101 R, 84

[56] References Cited

U.S. PATENT DOCUMENTS

| | | | |
|---|---|---|---|
| 3,848,049 | 11/1974 | Ronzio et al. | 423/54 |
| 3,932,580 | 1/1976 | Vertes et al. | 423/56 |
| 3,957,946 | 5/1976 | Ronzio et al. | 423/56 |
| 4,207,296 | 6/1980 | Nauta et al. | 423/593 |
| 4,595,412 | 6/1986 | Brunelli et al. | 75/84 |

*Primary Examiner*—Theodore Morris
*Attorney, Agent, or Firm*—L. Rita Quattrini; Robert E. Walter

[57] ABSTRACT

A method is disclosed for producing fine size molybdenum trioxide powder which involves heating ammonium dimolybdate in ambient atmosphere at a temperature of from about 455° C. to about 465° C. for a time of from about 5 hours to about 6 hours to produce a first molybdenum trioxide which is granulated to about −10 mesh and then heated in a furnace in which there are three heating zones. The first molybdenum trioxide is heated in the first heating zone at a temperature of from about 550° C. to about 590° C., in the second heating zone at a temperature of from about 580° C. to about 610° C. and thereafter in the third heating zone at a temperature of from about 580° C. to about 625° C., with the feed rate of material in the three zones being from about 1.5 to about 3.0 kg/hr to produce a yellow molybdenum trioxide. The yellow molybdenum trioxide is then cooled and granulated to about −40 mesh. The molybdenum trioxide thus produced has a particle size of from about 2.0 to about 10.0 micrometers in diameter and a surface area of from about 0.1 to about 1.5 M$^2$/g.

2 Claims, No Drawings

METHOD FOR PRODUCING FINE SIZE YELLOW MOLYBDENUM TRIOXIDE POWDER

This invention relates to a method for producing fine molybdenum trioxide powder of a specific particle size and surface area by heating ammonium dimolybdate under specific heating conditions of temperature and time. The method can be relied on to consistently produce the desired particle size and surface area in the molybdenum trioxide.

BACKGROUND OF THE INVENTION

Molybdenum trioxide, in particular yellow molybdenum trioxide having a specific particle size and surface area is sometimes desired. Up to this time reliable methods to control these characteristics in molybdenum trioxide did not exist. Prior methods were trial and error as ammonium dimolybdate (ADM) was heated at different temperatures and times until the desired properties were obtained. The disadvantages were inefficiency and cost.

Therefore a method of consistently producing molybdenum trioxide of the above particle size and surface area would be highly desirable and an advancement in the art.

SUMMARY OF THE INVENTION

In accordance with one aspect of the invention, there is provided a method for producing fine size yellow molybdenum trioxide powder which involves heating ammonium dimolybdate in ambient atmosphere at a temperature of from about 455° C. to about 465° C. for a time of from about 5 hours to about 6 hours to produce a first molybdenum trioxide which is granulated to about −10 mesh and then heated in a furnace in which there are three heating zones. The first molybdenum trioxide is heated in the first heating zone at a temperature of from about 550° C. to about 590° C., in the second heating zone at a temperature of from about 580° C. to about 610° C. and thereafter in the third heating zone at a temperature of from about 580° C. to about 625° C., with the feed rate of material in the three zones being from about 1.5 to about 3.0 kg/hr to produce a yellow molybdenum trioxide. The yellow molybdenum trioxide is then cooled and granulated to about −40 mesh. The molybdenum trioxide thus produced has a particle size of from about 2.0 to about 10.0 micrometers in diameter and a surface area of from about 0.1 to about 1.5 $m^2/g$.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides methods for consistently producing fine molybdenum trioxide of a specific particle size and surface area by employing specific heating conditions of ammonium dimolybdate.

The starting ammonium dimolybdate can be produced by known methods such as by dissolving impure or technical grade molybdenum trioxide in ammonia and crystallizing relatively pure ammonium dimolybdate therefrom.

The procedure for producing yellow molybdenum trioxide having the desired particle size and surface area involves a combination of heating and granulating steps. The first step is to heat the ammonium dimolybdate in ambient atmosphere at a temperature of from about 455° C. to about 465° C. for a time of from about 5 hours to about 6 hours to produce a first molybdenum trioxide. The preferred conditions are about 457° C. for about 5.5 hours. This step produces a light greenish grey molybdenum trioxide.

The first molybdenum trioxide is then cooled usually to ambient temperature to allow it to be granulated.

The first molybdenum trioxide is then granulated to −10 mesh. The granulation is done by standard techniques which are well known in the art, such as by passing rotating or moving bars over the material which sits on a screen. The bars break up the material and the material passes through the screen when it reaches the mesh size of the screen.

The −10 mesh size molybdenum trioxide is then heated in ambient atmosphere in a furnace which is usually a tube furnace in which there are three heating zones. The first molybdenum trioxide is heated in the first heating zone at a temperaturez of from about 550° C. to about 590° C,. The first molybdenum trioxide is then heated in the second zone at a temperature of from about 580° C. to about 610° C. and thereafter it is heated in the third zone at a temperature of from about 580° C. to about 625° C. It is critical that the feed rate through these zones be from about 1.5 to about 3.0 kg. of material per hour. Therefore the residence time in the furnace will depend on the design of the furnace and the size of the charge. The molybdenum trioxide thus produced is a yellow molybdenum trioxide.

The resulting yellow molybdenum trioxide is then cooled to ambient temperature and then is granulated to about −40 mesh.

The yellow molybdenum trioxide produced by the above described method has a particle size as measured by Fisher Subsieve Size (FSSS) of from about 2.0 to about 10.0 micrometers in diameter and a surface area of from about 0.1 to about 1.5 $m^2/g$. Most typically the particle is from about 4.0 to about 6.1 micrometers in diameter and the surface area is most typically from about 0.35 to about 0.60 $m^2/g$.

By following the above described method, yellow molybdenum trioxide is consistently produced with the given particle size and surface area characteristics, thus the prior trial and error methods are avoided.

To more fully illustrate this invention, the following non-limiting example is presented.

EXAMPLE

About 4150 pounds of impure molybdenum trioxide is processed to ammonium dimolybdate by known techniques. About 750 kg of the resulting dry ammonium dimolybdate crystals are loaded into oven trays and fired to molybdenum trioxide in an oven at about 460° C. for about 5½ hours. The trays are then cooled and the resulting molybdenum trioxide is then granulated to −10 mesh. A total of about 630 kg of granulated molybdenum trioxide is then stoked through a furnace with three heating zones. Firing temperatures are held constant during the stoking period in the ranges of:

Zone 1: 582° C.
Zone 2: 604° C.
Zone 3: 621° C.

The tubes are opened to the atmosphere so that air could circulate through the material. The molybdenum trioxide is stoked at a rate of about 3.0 kg/hr. The residence time in the heating zones in the furnace is about 3 hours with the total furnace residence time being about 4.5 hours. The resulting yellow molybdenum trioxide has a particle size of from about 2.0 to about 10.0 micrometers in diameter as measured by FSSS and a surface area of from about 0.1 to about 1.5 $m^2/g$.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing yellow molybdenum trioxide powder, said method comprising:
    a) heating ammonium dimolybdate at a temperature of from about 455° C. to about 465° C. for a time of from about 5 hours to about 6 hours to produce a first molybdenum trioxide;
    b) granulating said first molybdenum trioxide to about −10 mesh;
    c) heating said −10 mesh first molybdenum trioxide in a furnace wherein there are three heating zones, wherein said first molybdenum trioxide is heated in the first heating zone at a temperature of from about 550° C., and thereafter is heated in the second heating zone at a temperature of from about 580° C. to about 610° C., and thereafter is heated in the third heating zone at a temperature of from about 580° C. to about 625° C., the feed rate of said first molybdenum trioxide through the three zones in said furnace being from about 1.5 to about 3.0 kg/hr to produce a yellow molybdenum trioxide; and
    d) cooling said yellow molybdenum trioxide; and
    e) granulating the resulting cooled molybdenum trioxide to about −40 mesh to produce yellow molybdenum trioxide having a particle size of from about 2.0 to about 10.0 micrometers in diameter as measured by "Fisher Subsieve Sizer" and a surface area of from about 0.1 to about 1.5 $m^2/g$.

2. The method of claim 1 wherein said yellow molybdenum trioxide has a particle size of from about 4.0 to about 6.1 micrometers in diameter as measured by "Fisher Subsieve Sizer" and a surface area of from about 0.35 to about 0.60 $m^2/g$.

* * * * *